United States Patent
Fender

(10) Patent No.: US 8,402,402 B1
(45) Date of Patent: Mar. 19, 2013

(54) METHOD FOR CALCULATING A MIXED I/O STANDARD SIMULTANEOUS SWITCHING NOISE (SSN) USING A NON-MIXED I/O STANDARD SSN MODEL

(75) Inventor: Joshua David Fender, East York (CA)

(73) Assignee: Altera Corporation, San Jose, CA (US)

( * ) Notice: Subject to any disclaimer, the term of this patent is extended or adjusted under 35 U.S.C. 154(b) by 866 days.

(21) Appl. No.: 11/946,380

(22) Filed: Nov. 28, 2007

Related U.S. Application Data

(60) Provisional application No. 60/869,544, filed on Dec. 11, 2006.

(51) Int. Cl.
  *G06F 17/50* (2006.01)
(52) U.S. Cl. ........ 716/106; 716/107; 716/108; 716/115; 716/134; 716/136
(58) Field of Classification Search .......... 716/106–115, 716/134, 136
  See application file for complete search history.

(56) References Cited

U.S. PATENT DOCUMENTS

| | | | |
|---|---|---|---|
| 2002/0095648 A1* | 7/2002 | Saito | 716/10 |
| 2002/0157067 A1* | 10/2002 | Yaguchi | 716/1 |
| 2006/0143581 A1* | 6/2006 | Ishikawa | 716/2 |
| 2008/0027662 A1* | 1/2008 | Kouzaki et al. | 702/57 |
| 2011/0239175 A1* | 9/2011 | Kouzaki et al. | 716/115 |

* cited by examiner

*Primary Examiner* — Paul Dinh
(74) *Attorney, Agent, or Firm* — Womble Carlyle Sandridge & Rice, LLP

(57) ABSTRACT

A method for determining simultaneous switching noise for multiple Input/Output (I/O) standards is provided by calculating incremental noise for the multiple I/O standards by considering a cumulative amount of noise contributed by previously assigned pins. In another embodiment, the number of pins being placed is considered rather than the cumulative amount of noise. When considering the cumulative amount of noise the I/O noise from corresponding I/O standards are characterized and a greater contributor is identified so that the I/O standard associated with the greater contributor can be assigned.

19 Claims, 11 Drawing Sheets

METHOD FOR CALCULATING A MIXED I/O STANDARD SIMULTANEOUS SWITCHING NOISE (SSN) USING A NON-MIXED I/O STANDARD SSN MODEL

CROSS REFERENCE TO RELATED APPLICATIONS

This application claims priority from U.S. Provisional Patent Application No. 60/869,544, filed Dec. 11, 2006, and entitled "Method for calculating a mixed I/O Standard Simultaneous Switching noise (SSN) Using a Non-Mixed I/O Standard SSN Model." This provisional application is herein incorporated by reference.

BACKGROUND

Simultaneous switching noise (SSN) from an aggressor input/output (I/O) pin in a device will impact nearby or proximate victim I/O pins of an electronic component because of the switching from the aggressor I/O pin. Attempts to characterize the SSN impact have not yielded robust techniques especially with regard to multiple I/O standards. Modeling the SSN behavior of a device is a difficult task in general. This problem is exacerbated further when dealing with a programmable logic device (PLD), such as a field programmable gate array (FPGA). It should be appreciated that due to the FPGA's support of numerous I/O standards, modes, and drive strengths, the problem becomes much more complex. Because of the flexibility of an FPGA it becomes nearly impossible to measure SSN noise for every possible I/O configuration combination. One of the shortcomings of prior attempts is the fact that these attempts have not considered the cumulative impact of the number of pins, or the cumulative impact of the noise from previously assigned pins, on pins to be assigned.

Accordingly, there is a need to measure SSN noise individually for each I/O standard and to use this data to estimate the SSN noise performance of the mixed I/O standards case.

BRIEF DESCRIPTION OF THE DRAWINGS

Aspects of the present invention will become apparent from the following detailed description, taken in conjunction with the accompanying drawings, illustrating by way of example the principles of the invention.

SUMMARY

Figure 1:
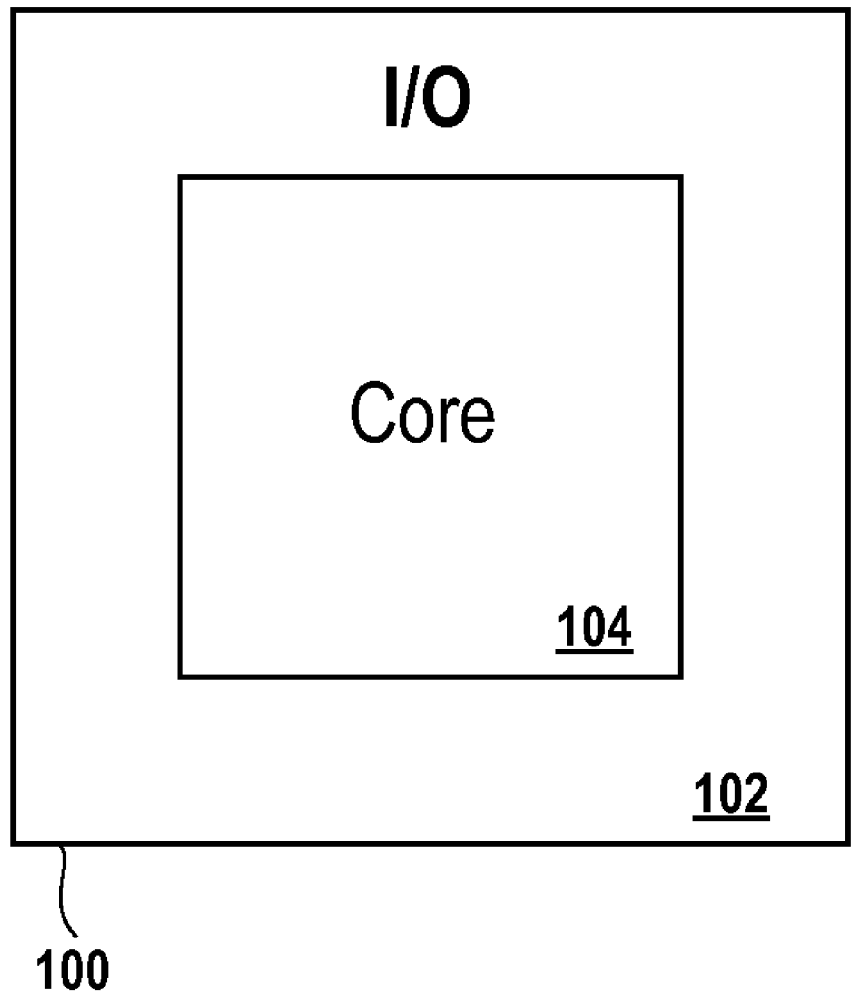
FIG. 1 is a high level design of a chip architecture in accordance with one embodiment of the invention.

The embodiments described below provide techniques to combine single I/O standard SSN noise data together to estimate mixed I/O standard noise that is present on a chip and the packaging containing the chip. It should be appreciated that the present invention can be implemented in numerous ways, such as a process, an apparatus, a system, a device or a method on a computer readable medium. Several inventive embodiments of the present invention are described below.

In one embodiment, a method for determining simultaneous switching noise for multiple Input/Output (I/O) standards is provided by calculating incremental noise for the multiple I/O standards by considering a cumulative amount of noise contributed by previously assigned pins. In another embodiment, the number of pins being placed is considered rather than the cumulative amount of noise. When considering the cumulative amount of noise the I/O noise from corresponding I/O standards are characterized and a greater contributor is identified so that the I/O standard associated with the greater contributor can be assigned.

In another embodiment, a system configured to estimate the simultaneous switching noise for multiple Input/Output (I/O) standards is provided. the system may be utilized for an integrated circuit design or an actual silicon chip. The system essentially executes the functionality described herein to estimate mixed I/O standard noise so that an optimum pin placement configuration can be obtained.

Other aspects and advantages of the invention will become more apparent from the following detailed description, taken in conjunction with the accompanying drawings, illustrating by way of example the present invention.

DETAILED DESCRIPTION

In the following description, numerous specific details are set forth in order to provide a thorough understanding of the present invention. It will be apparent, however, to one skilled in the art that the present invention may be practiced without some or all of these specific details. In other instances, well known process operations have not been described in detail in order not to unnecessarily obscure the present invention.

The embodiments described herein provide techniques to combine single I/O standard SSN noise data together to estimate mixed I/O standard noise that would be present on a chip. In one embodiment, the technique accurately models SSN in a manner that incremental noise of the nth pin is dependent on the amount of noise of the previous pins. In one exemplary embodiment, the number of pins used provides the amount of noise. Thus, through the embodiments, a more knowledgeable decision may be made on pin locations so that a minimum impact from SSN is experienced by the design even though numerous I/O standards are supported by the semiconductor device. It should be appreciated that the embodiments described herein may be incorporated into electronic design automation (EDA) software, such as the QUARTUS™ software owned by the assignee. Of course, the embodiments may be incorporated into any suitable EDA software and are not limited to the QUARTUS™ application. One skilled in the art will appreciate that the embodiments described herein may be applied to an actual chip which has been fabricated. That is, once the chip is actually fabricated, the simultaneous switching noise (SSN) for the I/O pins may be calculated according to the embodiments described below. However, it should be appreciated that the embodiments described herein also may be applied in the design process of an integrated circuit, if desired.

The pseudo code presented below effectively assumes that the noise contribution of the nth aggressor can be calculated as Victim_Noise$_{iostd}$[n]−Victim_Noise$_{iostd}$[n−1]. The algorithm corresponding to the pseudo code then extends this by grouping the I/O standards in such a way that standards with the worst noise, at the one switching aggressor case, are examined prior to standards with less noise.

Assumptions
Victim_Noise$_{iostd}$=fn$_{iostd}$(# of aggressor POs switching) for each I/O standard
Aggressor array of (I/O standard, # of pins) pairs
Victim Pin
Pseudo Code
1) For each I/O standard in the aggressor array calculate Victim_Noise$_{iostd}$[1 switching aggressor].
2) Sort the aggressor array by the calculated 1 aggressor victim noise (highest noise first)
3) Set noise_accumulator=0
4) Set processed_pins=0
5) For each PO standard
   a. Noise_accumulator+=victim_noise$_{iostd}$(processed_pins+(# of pins)$_{iostd}$)−victim_noise$_{iostd}$(processed_pins)
   b. Processed_pins+=(# of pins)$_{iostd}$ The embodiments described below further improve on this technique. As a high level overview, the technique may be segregated into three operations. A first operation involves manipulating the non-mixed I/O standard SSN noise model/data to an intermediate form that models SSN as an effective noise on the I/O buffer power and ground rails. The second operation involves estimating the amount of effective noise induced on an I/O buffer power or ground rail. The third operation manipulates the effective noise to determine how much SSN noise will be present at the far end of the victim pin's PCB trace. Each of these operations are further described below.

In one embodiment, SSN is measured at the far-end of a transmission line. The measured SSN noise voltage seen at the far-end has been attenuated based on the output driver's current strength and the termination network that the driver is connected to. Correspondingly this means that a fixed amount of on-die SSN noise causes a different amount of far-end noise depending on the output driver's I/O standard. In order to model mixed I/O standard SSN noise a method of estimating on die SSN noise from the far-end noise data is provided by the embodiments described below. For the purposes of the embodiments provided herein, SSN can be thought to be caused by two major mechanisms. The first mechanism is a voltage supply rail sag, or ground rail bounce at the power supply of an I/O driver, and the second mechanism as mutual inductance coupling between the I/O pins on a multi pin integrated circuit (IC) package. In order to provide a simple model for injected SSN noise, the inductance induced noise can be modeled as an injected noise at the power supply, or ground connection, of an I/O buffer.

In one embodiment, the I/O buffer is modeled as a simple resistor connected to either the ground or the voltage supply rail, depending on if the buffer is driving low or high. Any SSN noise on the supply will be injected into the termination network, attenuated, and eventually show up at the far end noise measurement point. The injected noise can be calculated from a measurement of the far end noise using the inverse voltage divider equation shown below:

$$V_{noise}=((V_{far\_end}-V_{tt})*(R_{on}+R_s)+V\text{far\_end}*R_p)/R_p$$

Modeling SSN noise as a noise source at the supply or ground rail of an I/O buffer enables characterization of the noise source independent of the I/O standard, drive strength, and termination network. Thus, independent I/O standard data can be combined for mixed I/O standard cases. The below described pseudo code for an algorithm effectively assumes that the noise contribution of the nth aggressor is not related to the number n, but to the total amount of accumulated noise caused by the n−1 aggressors.

Assumptions
Victim_Eff_Noise$_{iostd}$=fn$_{iostd}$(# of aggressor I/Os switching) for each I/O standard
Aggressor array of (I/O standard, # of pins) pairs
Victim Pin
Pseudo Code
1) Set noise_accumulator=0
2) Set unprocessed_pins[I/O standard]=# of aggressors of I/O Standard
3) While unprocessed_pins array has a non-zero entry
   a. For each non-zero entry in the unprocessed_pins array calculate:
Bias_point$_{iostd}$=inverse_victim_eff_noise$_{iostd}$(noise_accumulator)
   Where Bias_point$_{iostd}$ is the number of aggressor pins of standard iostd necessary to induce a 'noise_accumulator' amount of noise. (This number can be fractional)
Incremental_Noise$_{iostd}$=victim_eff_noise$_{iostd}$(Bias_Point$_{iostd}$+1)−noise_accumulator
   b. Find I/O standard with greatest non-zero Incremental_Noise$_{iostd}$
   c. noise_accumulator+=Incremental_Noise$_{worst\_iostd}$
   d. unprocessed_pins[worst I/O standard]−=1
4) The noise_accumulator now contains an estimate for worst case effective noise Effective SSN noise, defined as a noise source connected to the supply or ground rails of an I/O buffer, can easily be transformed into a measurable far-end noise through the use of the same voltage divider network. The far end noise can be calculated from the injected supply noise using the well known voltage divider equation, shown below:

$$V_{far\_end}=((R_s+R_{on})*V_{tt}+R_p*V_{noise})/(R_s+R_{on}+R_p)$$

The embodiments described herein address the issue of combining single I/O standard SSN data to estimate mixed I/O standard SSN noise more effectively. Through the embodiments the noise monotonically increases as the number of aggressor I/Os are increased, termination network and drive strength effects on SSN are considered where these effects have been previously ignored, and the embodiments limit the estimate of mixed SSN noise to the greatest amount of non-mixed noise from all individual SSN noise models/data. As mentioned above, the disclosed technique assumes the noise contribution of nth pin is dependent on the amount of noise produced by first n−1 pin where as the previous method assumed the contribution of pin n is dependant only on the pin number (n) in one embodiment, i.e., the technique assumes a noise bias where as pin method assumes a pin bias. Previous techniques assume that all pins of a given I/O standard are grouped together as part of the noise calculation algorithm, this assumption is not considered in one embodiment. The embodiments below account for termination network and drive strength effects on SSN, whereas previous techniques provided no such ability. In addition, the embodiments provide a monotonic solution and the disclosed technique limits the maximum combined I/O standard noise to the greater of the two non-mixed standard cases, whereas previous techniques predict more noise for a combined case than in the separate individual I/O cases.

FIG. 1 is a high level design of a chip architecture in accordance with one embodiment of the invention. Chip 100 consists of I/O ring 102 which surrounds core 104. As is generally known, I/O ring 102 will operate at a higher voltage than core 104. I/O ring 102 includes a number of I/O pins which provide pathways into and out of core region 104. It should be appreciated that chip 100 may be placed into a suitable package for eventual placement onto a printed circuit board. Consequently, a chip supplier/owner will desire to understand the impact of the effects of assigning particular I/O standards to the I/O pins. Described below are details providing one such technique for determining a worst case scenario when the chip supports multiple I/O standards. On skilled in the art that exemplary I/O standards include low voltage transistor-transistor logic (LVTTL), low voltage complementary metal oxide semiconductor (LVCMOS), stub series terminated logic (SSTL), hypertransport technology (HSTL), peripheral component interconnect (PCI), and peripheral component interconnect express (PCI-X) standards, as well as other known standards.

Figure 2:
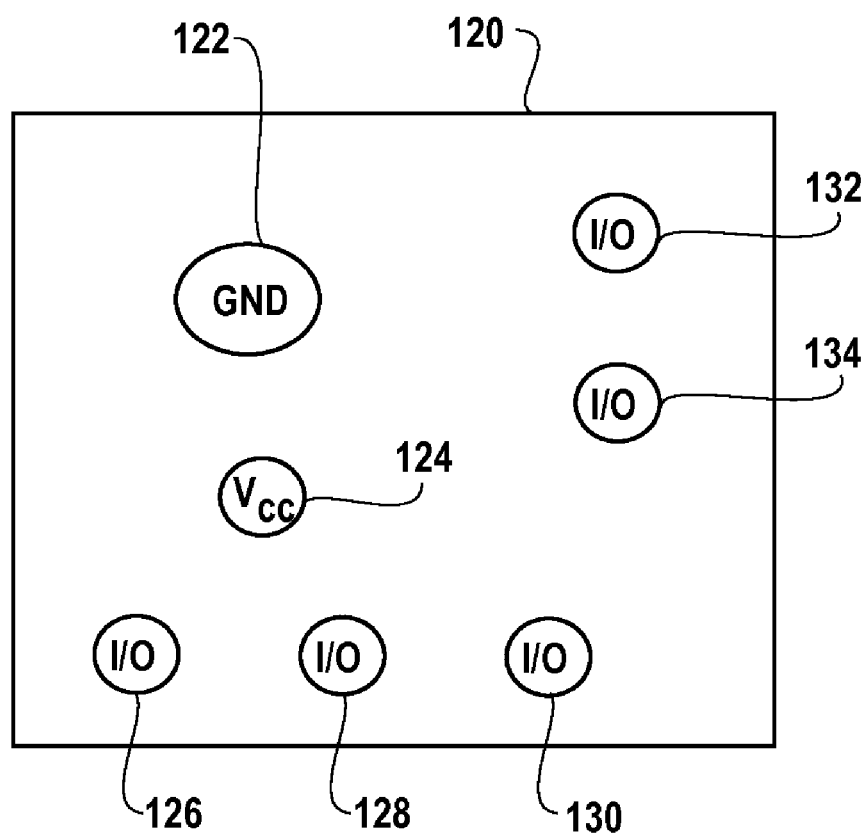
FIG. 2 is a simplified schematic diagram illustrating a possible packaging configuration for pins of a chip package such as the package of FIG. 1 in accordance with one embodiment of the invention.

FIG. 2 is a simplified schematic diagram illustrating a possible packaging configuration for pins emanating from a chip package such as the package of FIG. 1 in accordance with one embodiment of the invention. As illustrated, various pins such as ground pin 122, $V_{cc}$ pin 124 and I/O pins 126, 128, 130, 132, and 134 are provided. In one embodiment, pin 128 may be characterized as an aggressor pin because of the switching taking place through pin 128. This switching impacts pins 126 and 130 which are proximate to pin 128. The embodiments described herein characterize the noise generated from the switching of pin 128 on pins 126 and 130, assuming a worst-case scenario in one technique and provide a cumulative effect for the noise in another technique due to SSN of the aggressor I/O pin or pins so that a supplier can use this information to have a better understanding of the actual operating conditions for the chip.

Figure 3:
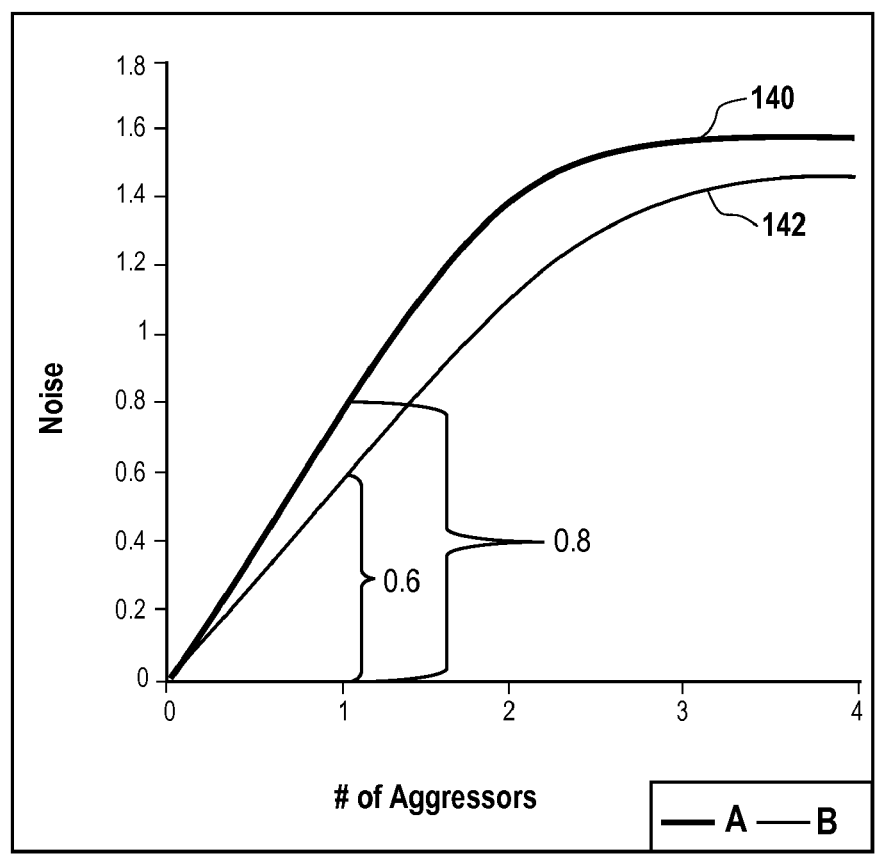
FIG. 3 represents a graph illustrating the Input/Output (I/O) noise curves for a first I/O standard (standard A) and a second I/O standard (standard B) and the assignment result of a first pin of a set of pins in accordance with one embodiment of the invention.

FIGS. 3 through 8 are provided to illustrate one exemplary technique where the process of determining the SSN noise is based on a number of I/O pins used by the mixed I/O standards. FIG. 3 represents a graph illustrating the Input/Output (I/O) noise curves for a first I/O standard (standard A) and a second I/O standard (standard B) and the assignment result of a first pin of a set of pins in accordance with one embodiment of the invention. Curve 140 represents the I/O noise curve for standard A, while curve 142 represents the I/O noise curve for standard B. Initially, the number of unassigned pins for each of standard A and standard B is provided. For the sake of explanatory purposes, in this example, the number of unassigned pins for standard A is equal to 3, while the number of unassigned pins for standard B is equal to 1. Thus, a total of four pins are to be assigned between the first and second I/O standards. Under the technique discussed with regard to FIGS. 3-8, the incremental noise of the first pin for each standard is calculated. As illustrated in FIG. 3, the noise for pin 1 under standard A is 0.8 volts while the noise associated with standard B is 0.6 volts for pin 1. Since the noise for standard A (0.8 volts) is greater than the noise for standard B (0.6 volts), the first pin is placed at location 1 under standard A. That is, a worst-case scenario is assumed.

Figure 4:
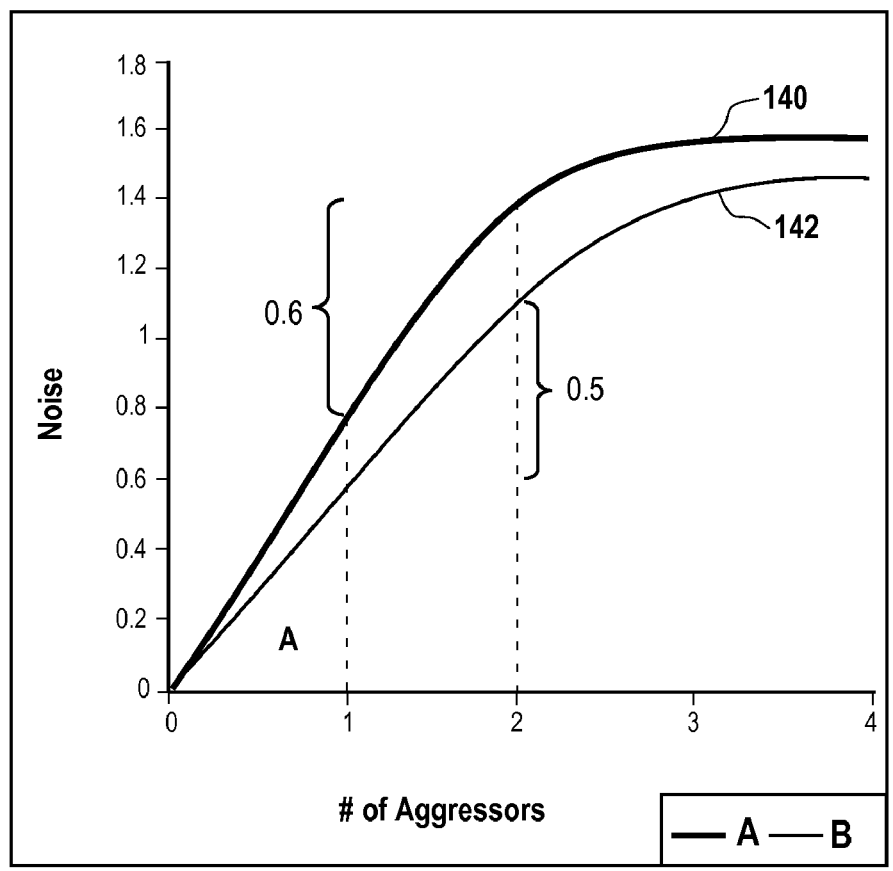
FIG. 4 represents a graph illustrating the assignment for the next pin of the three remaining unassigned pins in accordance with one embodiment of the invention.

FIG. 4 represents a graph illustrating the assignment for the next pin of the three remaining unassigned pins in accordance with one embodiment of the invention. As the first pin has been assigned, the process starts with aggressor 1 on the X axis. As illustrated in FIG. 4, the incremental noise for a second pin according to standard A and standard B is determined. The incremental noise for a second pin under standard A is 0.6 volts between aggressor pins 1 and 2 on curve 140, while the incremental noise of a pin placed under standard B is 0.5 volts on curve 142. As the noise of standard A is greater than the noise of standard B (0.6>0.5), the second pin is assigned to standard A.

Figure 5:
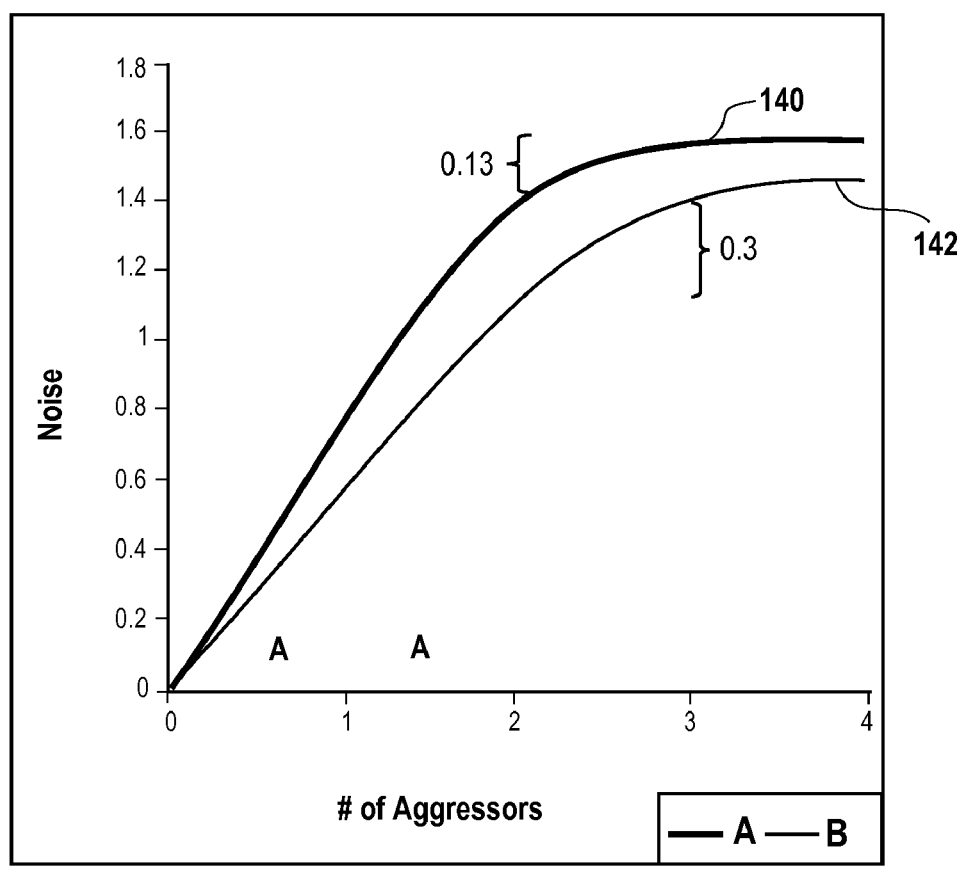
FIG. 5 represents a graph illustrating the assignment of a third pin in accordance with one embodiment of the invention.
Figure 6:
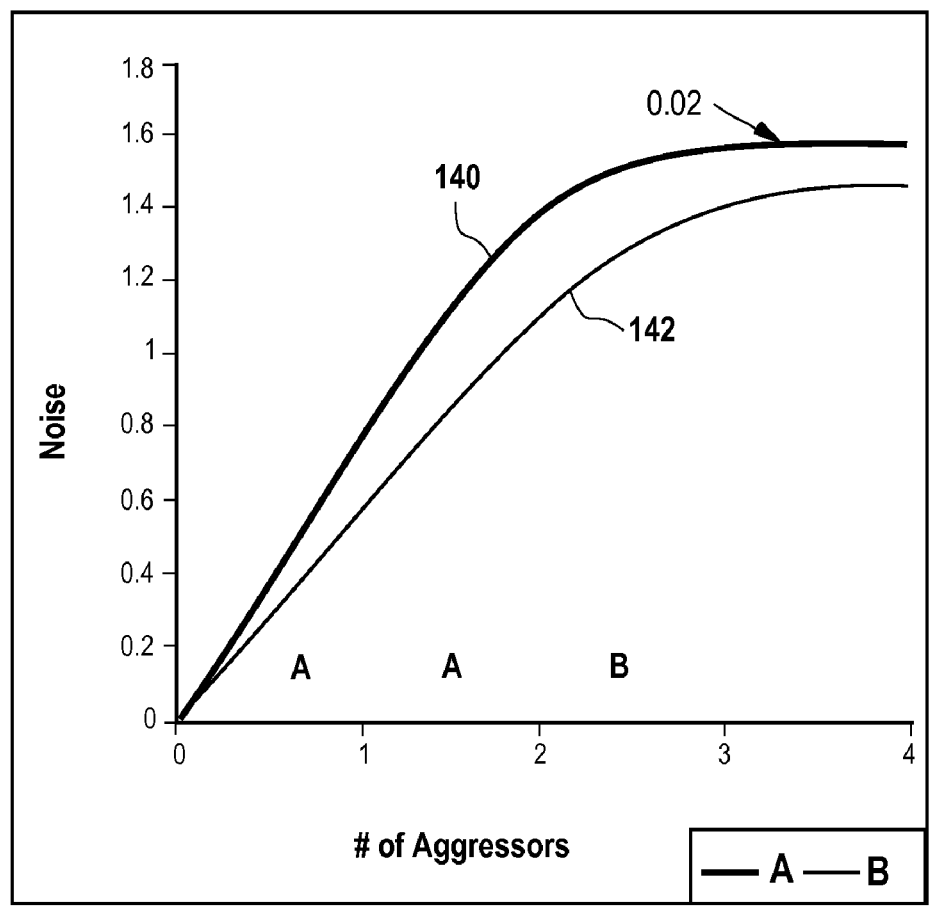
FIG. 6 represents a graph illustrating the assignment of a last pin in accordance with one embodiment of the invention.

Moving to FIG. 5, two unassigned pins remain, one for each standard. As illustrated in FIG. 5, the process begins at pin aggressor 2 on the X axis, which correlates to the two pins that have been assigned. Under standard A the incremental noise due to a third pin is 0.13 volts along curve 140, while the incremental noise under standard B is 0.3 volts along curve 142. Since the incremental noise under standard B is greater than the incremental noise under standard A, the pin at location 3 is assigned to standard B in this scenario. It should be noted that in the embodiments described in FIGS. 3-5, the incremental noise is based on the number of pins assigned, i.e., the technique moves along the aggressor pins on the x axis. FIG. 6 represents the assignment of the last remaining pin. As there is only one remaining pin, it is assigned standard A and the incremental noise is 0.02 volts.

Figure 7:
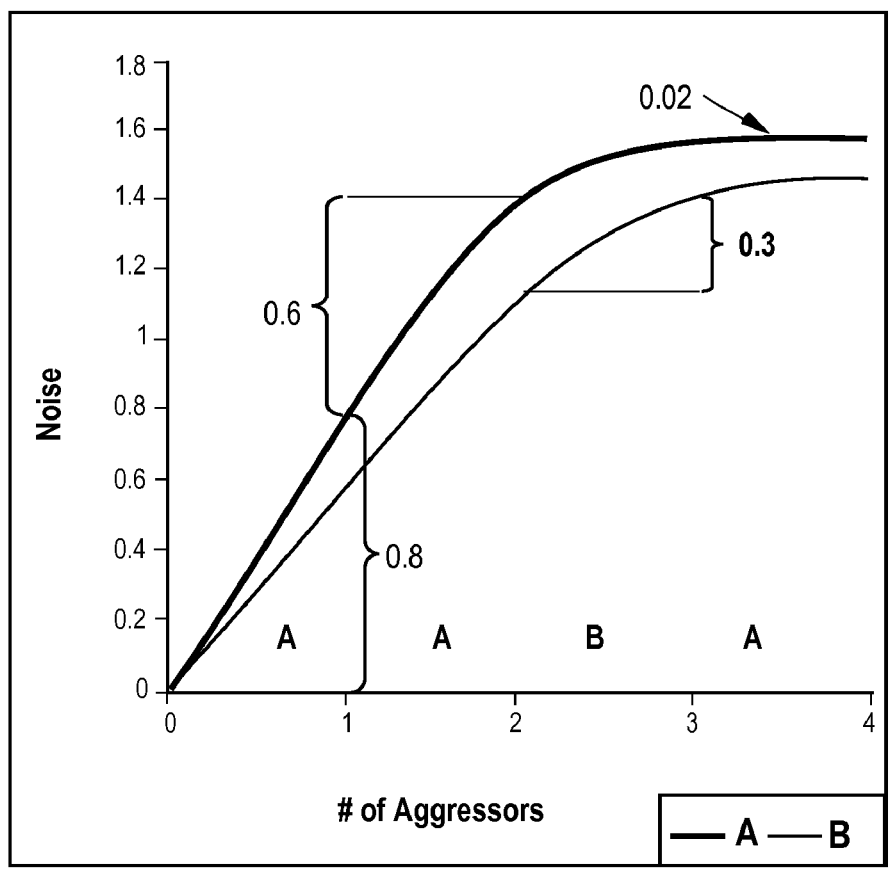
FIG. 7 is a graph representing the total noise calculated under a worst-case scenario through one exemplary technique illustrated through FIGS. 3-6.
Figure 8:
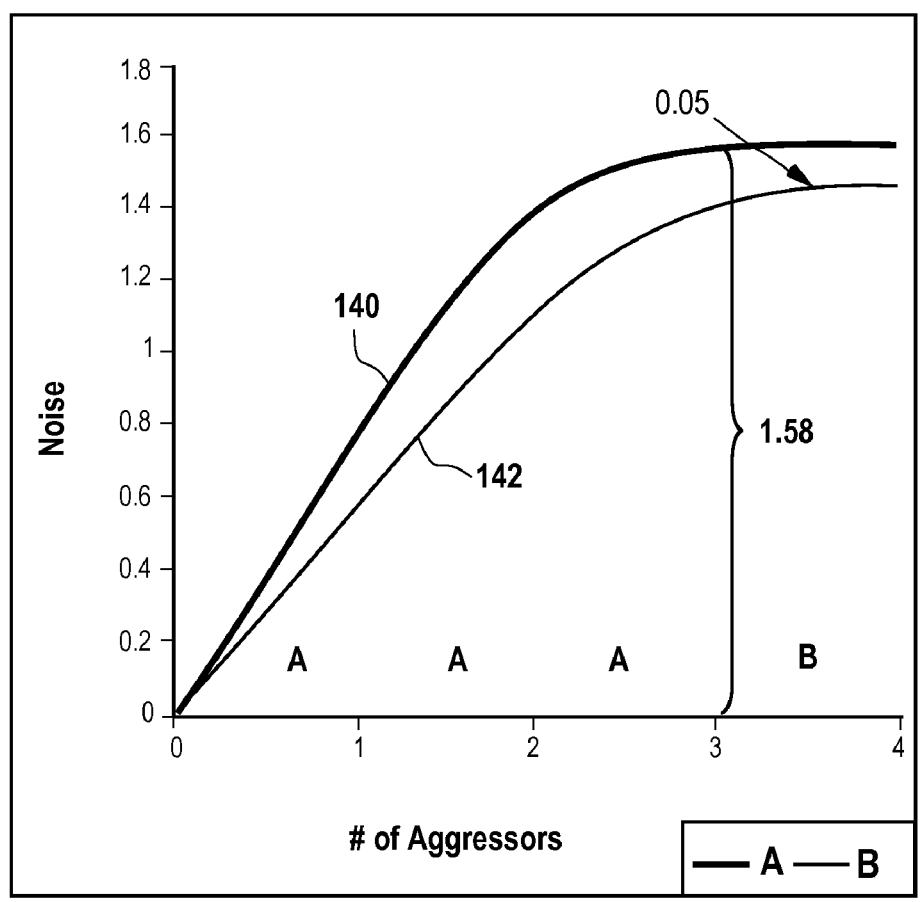
FIG. 8 illustrates the difference between the method described with reference to FIGS. 3-7 and a technique which simply assigned the first three pins to I/O standard A and the fourth pin to I/O standard B.

FIG. 7 is a graph representing the total noise under the worst-case scenario through the technique provided herein. The worst-case noise is determined by adding up the total incremental noise based on the number of I/O pins, which sums to 1.72 volts. FIG. 8 illustrates the difference between the method provided through FIGS. 3-7 and a previous technique which simply assigned the first three pins to I/O standard A and the fourth pin to I/O standard B. Under this previous technique, where it is assumed that I/O standards are grouped together, the total noise would be 1.58 volts. Thus, the worst-case technique described with regard to FIGS. 3-7 has a difference of 0.14 volts with the prior method.

As an alternate technique to the technique described with regards to FIGS. 3-8, accumulated noise is focused on rather than the total number of pins. In essence, the example with regard to FIGS. 3-7 uses the x axis to sequentially process the number of pins to determine the incremental noise. In contrast, the embodiment now described focuses on the noise level for previously assigned pins, rather than the amount of previously assigned pins. Thus, the embodiments described with reference to FIG. 9 focus on the noise level, i.e., the y axis, and do not consider the number of pins as in the previous technique. That is, the incremental noise of each pin assignment is considered as opposed to the pin number. Under the alternate embodiment, the incremental noise of a first pin is calculated as discussed with reference to FIG. 3. However, in FIG. 4, rather than starting from a pin number 1 and then figuring out the incremental noise for a second pin (pin 2)

under each I/O standard, the starting point under the second embodiment would be 0.8 volts on the y axis. From this point, the corresponding pin number is found from the I/O curve and then the noise from the next sequential pin number from the corresponding pin number is used to determine the incremental noise. It should be noted that the corresponding pin number need not be a whole number. Thus, from whatever the corresponding pin number is, the noise for the next pin number is determined where the noise may correspond with a non-whole number pin of the x axis. For example, with regard to FIG. 4, at a noise level of 0.8 volts, the position on the x axis for the intersection of curve 140 is at 1, but the intersection of curve 142 occurs at about 1.4. Thus, for the calculation for the assignment of the second pin, the noise for curve 140 is calculated between positions 1 and 2 of the x axis, while the noise for curve 142 is calculated between positions 1.4 and 2.4 of the x axis. Thus, the actual pin numbers are not considered as the technique proceeds. That is, the technique utilizes unit increases corresponding to the cumulative noise to drive the calculations for assigning the I/O standards.

Figure 9:
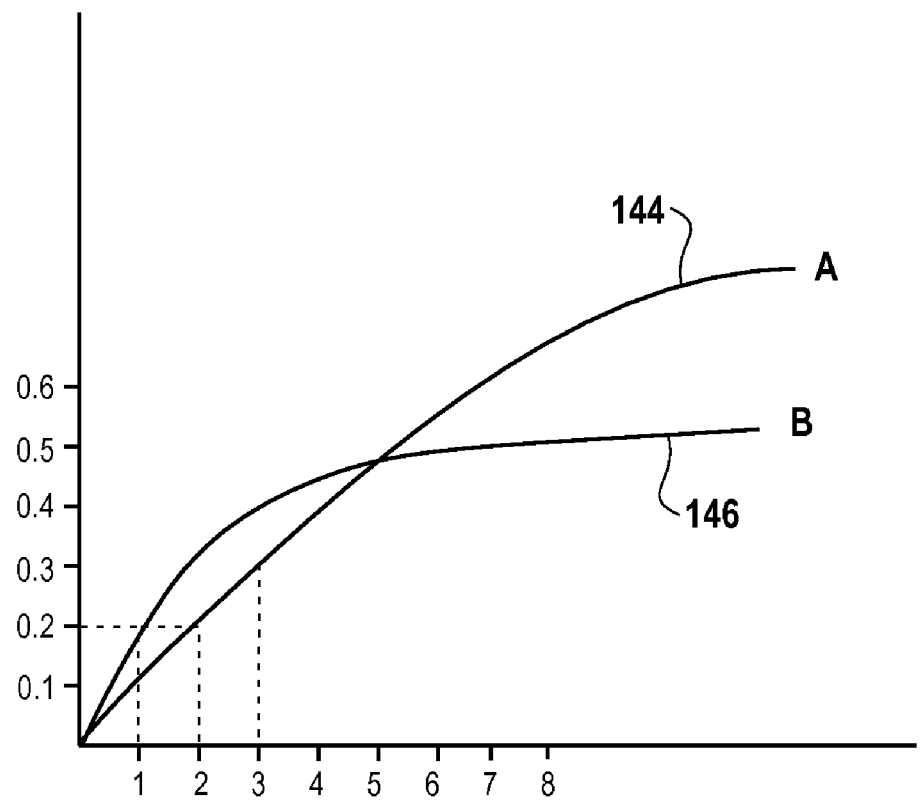
FIG. 9 illustrates an example of the improvement to the example provided in FIGS. 3-8, where the improvement focuses on the accumulated noise instead of the number of pins being placed, in accordance with one embodiment of the invention.

FIG. 9 illustrates an example of the improvement to the example provided in FIGS. 3-8, where the improvement focuses on the accumulated noise instead of the number of pins being placed, in accordance with one embodiment of the invention. In FIG. 9, a graph characterizing the noise for two I/O standards is provided. As mentioned above, this type of graph characterizing the noise may be referred to as an I/O curve. Curve 146 for standard B has a lower total noise level associated than curve 144 for standard A, but curve 146 for standard B initially has a higher slope than curve 144. When calculating the I/O noise under the improved technique, a first pin is looked at to provide the incremental noise. Thus, at the first pin under standard B a noise of approximately 0.2 volts is provided, while under standard A the noise level is approximately 0.1 volts. Thus, the first pin would be assigned to standard B, since standard B represents the worst case, i.e., is the greatest contributor to the noise level. The next point for the calculation is based on the total amount of noise accounted for rather than the total amount of pins, as opposed to the technique discussed above with regard to FIGS. 3-8. That is, under standard A, 0.2 volts would determine the starting point on the x axis and a next pin would approximately bring an additional 0.15 volts, which represents the voltage difference between points two and three of the x axis on curve 144. It should be noted that while this embodiment is assigning the second pin, the difference for standard A on curve 144 is evaluated between the second and third pins as the accumulated noise is focused on in this embodiment, as opposed to the number of pins. Under standard B for the second pin, 0.1 volts is added when moving from the first to the second pin, which is based on the accumulated noise from the first pin. Therefore, the second pin is assigned to standard A. This technique is repeated for successive pins where the amount of noise accumulated is used as a basis for proceeding rather than relying on a total number of pins assigned. It should be appreciated that a different result would come about if the technique applied as described with regard to FIGS. 3-7 is performed with the I/O curves of FIG. 9.

Figure 10:
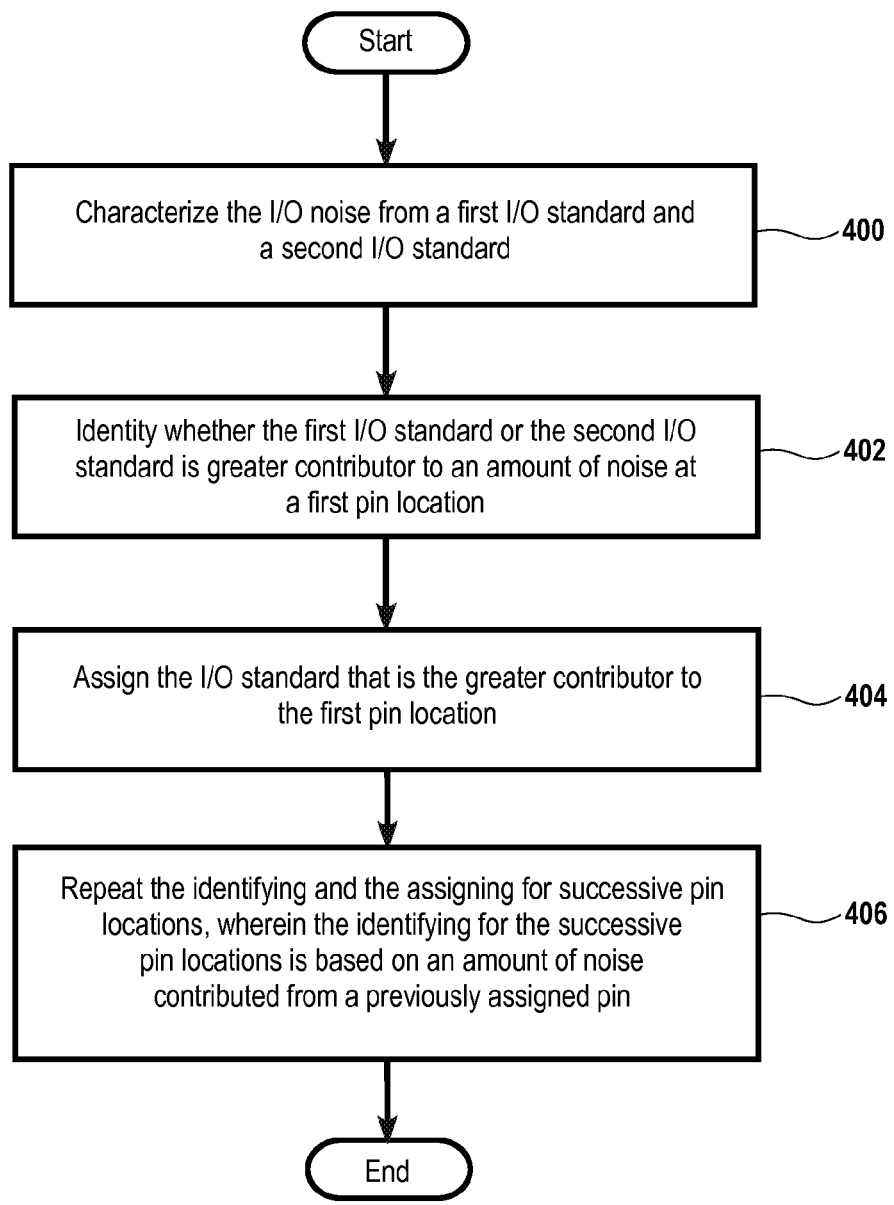
FIG. 10 is a flowchart illustrating the method operations for determining simultaneous switching noise for multiple Input/Output (I/O) standards in accordance with one embodiment of the invention.

FIG. 10 is a flowchart illustrating the method operations for determining simultaneous switching noise for multiple Input/Output (I/O) standards in accordance with one embodiment of the invention. The method initiates with operation 400, where the I/O noise from a first I/O standard and a second I/O standard is characterized. In one exemplary embodiment an I/O curve may be generated to characterize the noise as illustrated in the above described Figures. Of course, the data for the curve may be stored in a database and accessed to generate the I/O curve for the particular standards. The method then advances to operation 402, where either the first I/O standard or the second I/O standard is identified as a greater contributor to an amount of noise at a first pin location. As described with regard to FIGS. 3 and 9, the amount of noise contribution from the first pin under each standard is looked at and the standard having the greater noise contribution is selected, as specified in operation 404, where the I/O standard that is the greater contributor to the first pin location is assigned to the respective pin location. In operation 406, the identifying and the assigning are repeated for successive pin locations. The repeating for operation 406 identifies the successive pin locations based on an amount of noise contributed from a previously assigned pin. As mentioned with reference to FIG. 9, the accumulated noise is the basis for successive pin assignments rather than the number of pins assigned. In essence, this embodiment switches focus from the x axis (number of pins) as focused on for FIGS. 3-8, to the y axis (accumulated noise) as focused on for FIG. 9. It should be appreciated that the embodiments described herein were discussed with regard to two I/O standards. However, this is not limiting as the embodiments may be applied to any number of I/O standards and scale accordingly to accommodate the I/O standards. In addition, the embodiments may base the pin assignments on the number of pins assigned, as this technique provides acceptable results. However, the results based on the accumulated noise as discussed with reference to FIG. 9 provides improved accuracy.

Figure 11:
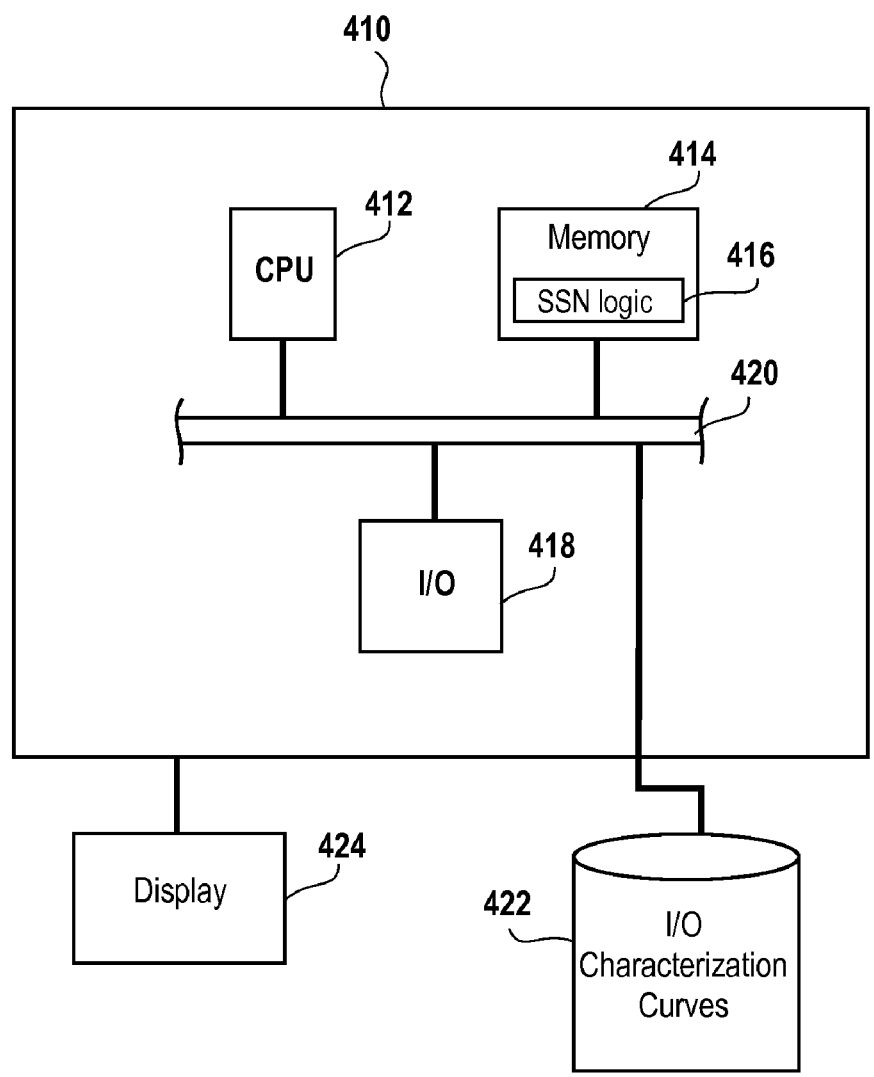
FIG. 11 is a simplified schematic diagram illustrating a system configured to execute simultaneous switching noise logic for pin location placement for a semiconductor design in accordance with one embodiment of the invention.

FIG. 11 is a simplified schematic diagram illustrating a system configured to execute simultaneous switching noise logic for pin location placement for a semiconductor design in accordance with one embodiment of the invention. System 410 includes central processing unit (CPU) 412, memory 414, and Input/Output (I/O) unit 418. CPU 412, memory 414, and I/O unit 418 are in communication with each other over bus 420. Memory 414 includes SSN logic 416. SSN logic 416 may be embodied as program instructions, which when executed by CPU 412, causes the CPU to execute functionality as described with reference to the above Figures and corresponding text. System 410 is in communication with display 424. Display 424 is configured to present a layout of I/O standards through a graphical user interface as the standards are assigned to pin locations under the embodiments described herein. Database 422 is capable of being accessed by CPU 412 over bus 420 in one embodiment. Database 422 contains I/O characterization curves in one embodiment. The I/O characterization curves may be the data used to generate the curves illustrated in FIGS. 3-9 in one embodiment. Thus, for each I/O standard an individual characterization curve may be generated through the data within database 422.

In summary, the embodiments allow mixed I/O standard SSN to be estimated from non-mixed I/O standard SSN noise model/data. In one embodiment, the non-mixed I/O standard SSN noise model/data is manipulated or transformed to an intermediate form that models SSN as an effective noise on the I/O buffer power and ground rails for an integrated circuit design. An estimate of the amount of effective noise induced on an I/O buffer power or ground rail is then calculated. The effective noise is then manipulated to determine how much SSN is present at the far end of the victim's printed circuit board trace. SSN is typically measured at the far-end of a transmission line. The measured SSN noise voltage seen at the far-end has been attenuated based on the output driver's current strength and the termination network that it is connected to. Correspondingly this means that a fixed amount of on-die SSN noise causes a different amount of far-end noise depending on the output driver's I/O standard. In order to model mixed I/O standard SSN noise a method of estimating on die SSN noise from the far-end noise data is required. For the purposes of the model presented in the section, SSN can be thought to be caused by two major mechanisms. The first mechanism is a voltage supply rail sag, or ground rail bounce at the power supply of an I/O driver, and the second as mutual inductance coupling between the I/O pins on a multi pin IC package. In order to provide a simple model for injected SSN noise, it will be assumed that inductance induced noise can be modeled as an injected noise at the power supply, or ground connection, of an I/O buffer.

The embodiments, thus far, were described with respect to PLDs. The method and apparatus for in-system programmability, described herein may be incorporated into any suitable circuit. For example, the method and apparatus may be incorporated into other types of devices such as a programmable array logic (PAL), programmable logic array (PLA), field programmable logic array (FPLA), electrically programmable logic devices (EPLD), electrically erasable programmable logic device (EEPLD), logic cell array (LCA), field programmable gate array (FPGA), application specific standard product (ASSP), application specific integrated circuit (ASIC), just to name a few. Moreover, while the embodiments may be used with PLDs, this is not meant to be limiting. That is the embodiments described herein may be employed with any chip having I/O pins.

The programmable logic device described herein may be part of a data processing system that includes one or more of the following components; a processor; memory; I/O circuitry; and peripheral devices. The data processing system can be used in a wide variety of applications, such as computer networking, data networking, instrumentation, video processing, digital signal processing, or any suitable other application where the advantage of using programmable or re-programmable logic is desirable. The programmable logic device can be used to perform a variety of different logic functions. For example, the programmable logic device can be configured as a processor or controller that works in cooperation with a system processor. The programmable logic device may also be used as an arbiter for arbitrating access to a shared resource in the data processing system. In yet another example, the programmable logic device can be configured as an interface between a processor and one of the other components in the system. In one embodiment, the programmable logic device may be the STRATIX® II GX devices owned by the assignee.

Any of the operations described herein that form part of the invention are useful machine operations. The invention also relates to a device or an apparatus for performing these operations. The apparatus can be specially constructed for the required purpose, or the apparatus can be a general-purpose computer selectively activated, implemented, or configured by a computer program stored in the computer. In particular, various general-purpose machines can be used with computer programs written in accordance with the teachings herein, or it may be more convenient to construct a more specialized apparatus to perform the required operations.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims. In the claims, elements and/or steps do not imply any particular order of operation, unless explicitly stated in the claims.

What is claimed is:

1. A method for determining simultaneous switching noise for multiple Input/Output (I/O) standards for an integrated circuit design, said method comprising:
   modeling a first I/O noise from a first I/O standard and modeling a second I/O noise from a second I/O standard, with the first I/O standard and the second I/O standard specifying at least one from a set consisting of: a voltage, a drive strength, a mode, and a termination for pins of the integrated circuit design;
   determining a greater contributor to an amount of noise at a first pin location between said first I/O noise and said second I/O noise;
   assigning to the first pin location, after the determining, one of the first I/O standard or the second I/O standard, wherein the assigning is based on the greater contributor to the amount of noise at the first pin location;
   repeating the determining and the assigning for remaining successive pin locations, wherein each pin location having one of the first I/O standard or the second I/O standard so assigned acts as a previously assigned pin during the determining for the remaining successive pin locations, and the determining for each successive pin location is based on accumulating an amount of noise contributed from each such previously assigned pin; and
   providing I/O standard assignments for each pin location for the integrated circuit design, wherein at least one of the modeling, determining, assigning, or repeating is executed through a processor.

2. The method of claim 1, wherein a cumulative amount of noise monotonically increases as a number of pins increases.

3. The method of claim 1, wherein the modeling comprises, generating noise curves for the first and the second I/O standards.

4. The method of claim 1, wherein a number of pins is ignored at said determining for the remaining successive pin locations.

5. The method of claim 1, wherein the amount of noise contributed from each such previously assigned pin is accumulated with amounts of noise contributed from other previously assigned pins.

6. The method of claim 1, further comprising: repeating said modeling, said determining, said assigning, and said providing for an additional I/O standard.

7. A method for determining simultaneous switching noise for multiple Input/Output (I/O) standards specifying voltages, strengths, modes or terminations, comprising:
   assigning successively to each pin of a plurality of pin locations an I/O standard from the multiple I/O standards that contributes a greatest amount of incremental noise to the pin, wherein each pin having the I/O standard so assigned is regarded as a previously assigned pin during assigning to a subsequent pin;
   calculating the incremental noise for each pin based on a cumulative amount of noise contributed to by each such previously assigned pin, wherein the calculating is executed through a processor.

8. The method of claim 7, wherein a number of pins contributing to the cumulative amount is ignored.

9. The method of claim 7, further comprising:
   modeling noise for each of the multiple I/O standards.

10. The method of claim 7, further comprising:
    repeating the calculating and the assigning until each of the multiple I/O standards have been assigned corresponding pin locations.

11. The method of claim 7, wherein the accumulated amount of noise includes accumulated noise from each previously assigned aggressor pin.

12. The method of claim 7, wherein the cumulative amount of noise monotonically increases as a number of pins increases.

13. A non-transitory computer readable medium having program instructions that when executed by a computer implements a method for estimating mixed Input/Output (I/O) standard simultaneous switching noise (SSN) from non-mixed SSN data, said method comprising:
    assigning to each pin of a plurality of successive pin locations an I/O standard that contributes a greatest amount of incremental noise relative to multiple I/O standards each specifying for pins at least a voltage, a strength, a mode or a termination, with the pin being treated as a previously assigned pin when a subsequent pin receives the assigning;
    calculating the incremental noise for each pin by considering a cumulative amount of noise contributed to by each such previously assigned pin.

14. The computer readable medium of claim 13, wherein the assigning and the calculating further comprises:
    modeling a first I/O noise from a first I/O standard and modeling a second I/O noise from a second I/O standard;
    determining a greater contributor to an amount of noise at a first pin location between said first I/O noise and said second I/O noise;
    assigning, after the determining, one of the first I/O standard or the second I/O standard, wherein the assigning is based on the greater contributor to the amount of noise at the first pin location;
    repeating the determining and the assigning for remaining successive pin locations, wherein the determining for the remaining successive pin locations is based solely on an amount of noise contributed from a previously assigned pin; and
    providing I/O standard assignments for each pin location for the integrated circuit design.

15. The computer readable medium of claim 13, wherein the method further comprises;
    assigning an I/O standard from the multiple I/O standards that contributes a greatest amount of incremental noise to a corresponding pin location.

16. The computer readable medium of claim 14, wherein the modeling further comprises,
    generating noise curves for the first and the second I/O standards.

17. The computer readable medium of claim 13, wherein the cumulative amount of noise includes accumulated noise from each previously assigned aggressor pin.

18. The computer readable medium of claim 13, further comprising:
    assigning an I/O standard from the multiple I/O standards that contributes a greatest amount of incremental noise to a corresponding pin location while ignoring consideration of a cumulative amount of pins assigned.

19. The computer readable medium of claim 13, wherein the computer readable medium is in communication with a computing device for execution of the program instructions.

* * * * *